United States Patent [19]

Miansian

[11] Patent Number: 5,584,537
[45] Date of Patent: Dec. 17, 1996

[54] WHEEL SPINNER NUT ADAPTER

[76] Inventor: James K. Miansian, 21851 Rushford Dr., Lake Forest, Calif. 92630

[21] Appl. No.: 439,500

[22] Filed: May 11, 1995

[51] Int. Cl.[6] .................................................. G60B 29/00
[52] U.S. Cl. ..................... 301/35.63; 301/111; 301/105.1
[58] Field of Search ..................................... 301/111, 114, 301/115, 105.1, 35.63, 35.55, 35.58; 411/403

[56] References Cited

U.S. PATENT DOCUMENTS

| | | |
|---|---|---|
| 1,247,991 | 11/1917 | Ney . |
| 1,256,882 | 2/1918 | Dickinson . |
| 4,138,160 | 2/1979 | Lohmeyer ................................ 301/108 |
| 4,537,449 | 8/1985 | Hayashi ...................................... 301/9 |
| 4,944,562 | 7/1990 | Garrison .................................. 301/111 |

*Primary Examiner*—David M. Mitchell
*Assistant Examiner*—Jonathan J. Yun

[57] ABSTRACT

A wheel spinner nut adapter for a wheel assembly, the wheel assembly being of the type that utilizes a hub adapter, the hub adapter being of the type which has a first end for engaging a wheel and a wheel axle assembly, and a second end with external threads which are typically used for engagement with internal threads of a wheel spinner. The wheel spinner nut adapter of the present invention includes a first hollow end portion and a second end portion. The first hollow end portion includes a substantially smooth outer surface being tapered on at least a section thereof. The outer surface has a circular cross section. A threaded inner surface of the first hollow end portion has a circular cross section and substantially constant diameter. The threaded inner surface is for engagement with external threads on a second end of the hub adapter. A distal end of the outer surface has a relatively small diameter and a proximal end of the outer surface has a relatively large diameter so that the outer surface abuts and may be secured against a wheel hub of a wheel assembly when tightened relative to the hub adapter. The second end portion of the wheel spinner nut adapter is adjacent to the proximal end of the first hollow end portion. The second end portion has an outer surface for engagement with a wheel spinner, wheel cap or other device desired to be secured to the wheel assembly.

6 Claims, 2 Drawing Sheets

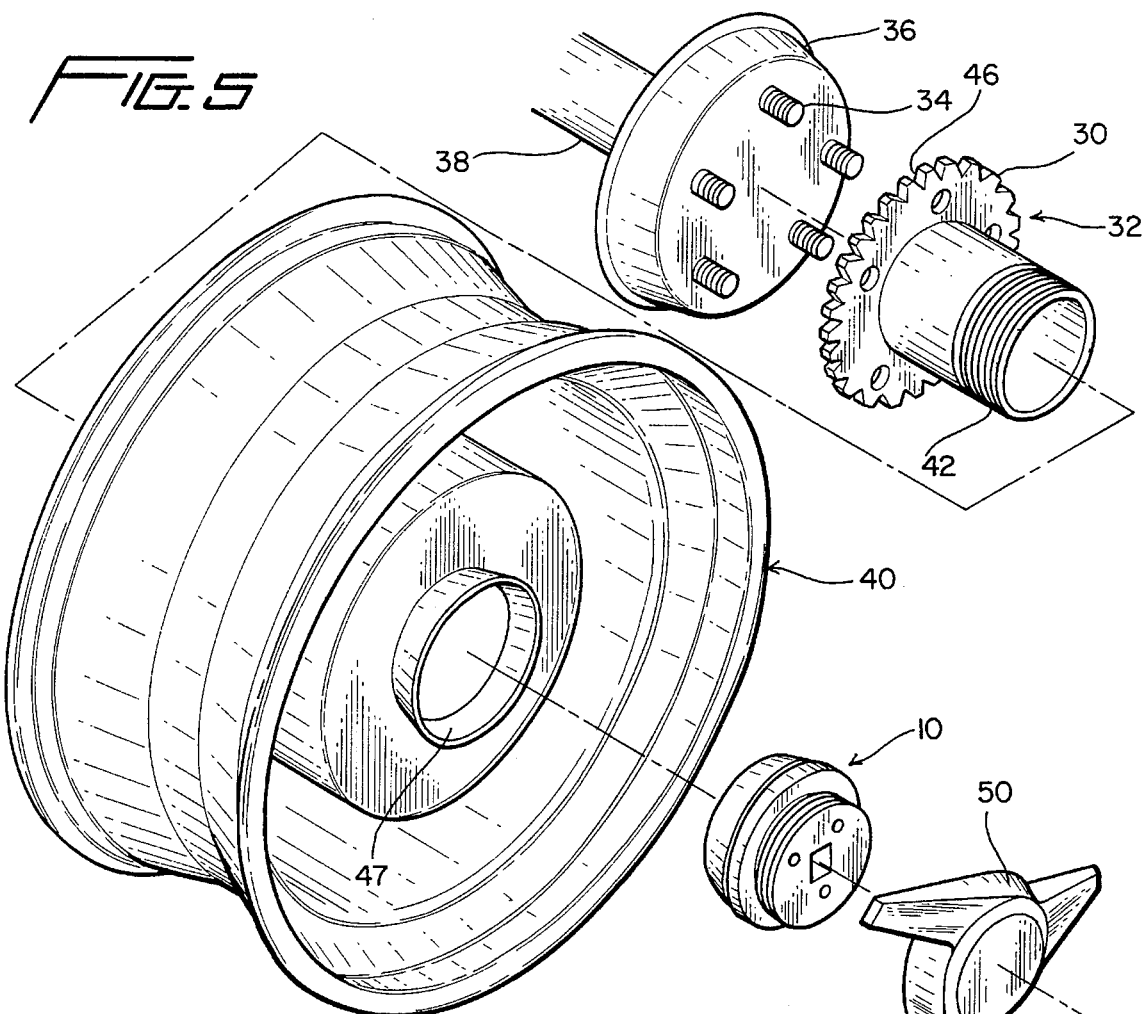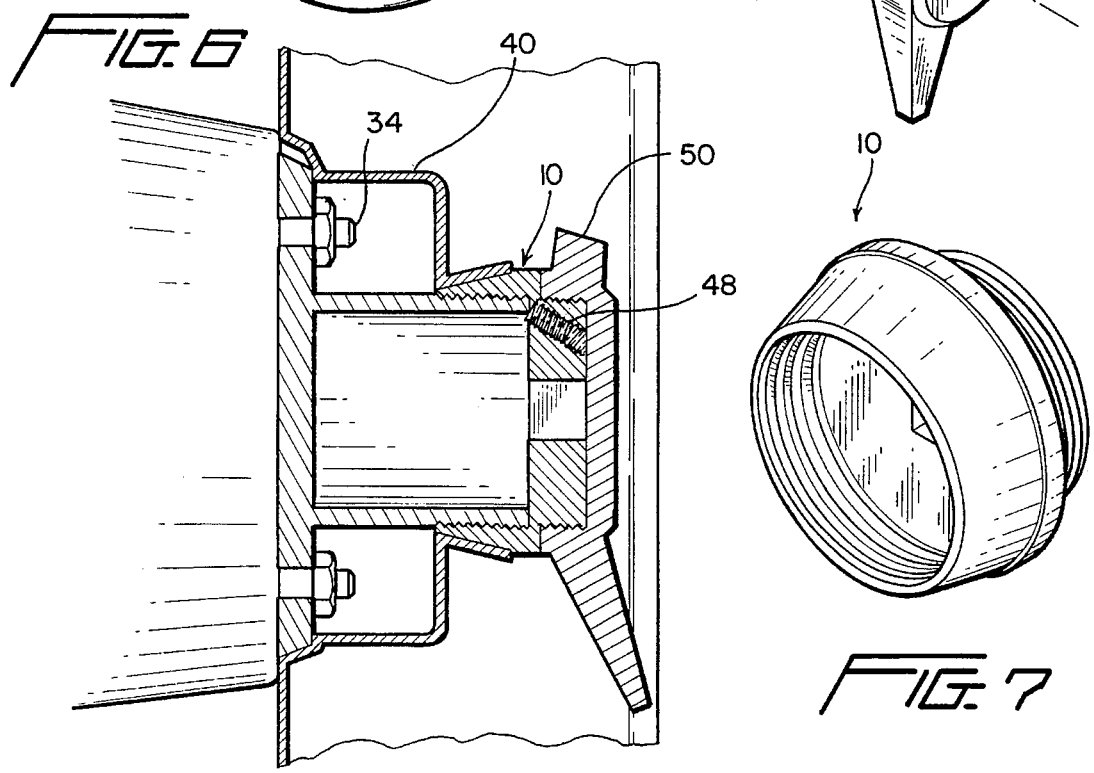

5,584,537

WHEEL SPINNER NUT ADAPTER

BACKGROUND OF THE INVENTION

1. Field of the Invention

The present invention relates generally to the mounting of wheel spinners and, more particularly, to a wheel spinner nut adapter for securing a wheel spinner to a wheel.

2. Description of the Related Art

Automobile wheels held in place by spinner nuts, i.e. spinners, are a well known and familiar sight among racing and competition vehicles. Additionally, a number of sports cars and boats, imported and domestic, have been provided with wire wheels or light alloy wheels which are mounted on the vehicle by spinner nuts. Wheels of this type are commonly referred to as knock-off wheels.

Normally the user of a wheel spinner nut first bolts a hub adapter to the automobile. He then places the wheel on the automobile. He then place the wheel on the hub adapter. Then he screws the wheel spinner nut on the hub adapter and tightens it. The user is generally limited to use of the particular wheel manufacturer's wheel spinner nut which has a particularly sized taper for accommodating the hub adapter and wheel hub.

As will be disclosed below, the present invention allows use of a different sized wheel spinner nut than that used by a particular manufacturer.

SUMMARY OF THE INVENTION

The present invention is a wheel spinner nut adapter for a wheel assembly, the wheel assembly being of the type that utilizes a hub adapter, the hub adapter being of the type which has a first end for engaging a wheel and a wheel axle assembly, and a second end with external threads which are typically used for engagement with internal threads of a wheel spinner. The wheel spinner nut adapter of the present invention comprises a first hollow end portion and a second end portion. The first hollow end portion includes a substantially smooth outer surface being tapered on at least a section thereof. The outer surface has a circular cross section. A threaded inner surface of the first hollow end portion has a circular cross section and substantially constant diameter. The threaded inner surface is for engagement with external threads on a second end of the hub adapter. A distal end of the outer surface has a relatively small diameter and a proximal end of the outer surface has a relatively large diameter so that the outer surface abuts and may be secured against a wheel hub of a wheel assembly when tightened relative to the hub adapter. The second end portion of the wheel spinner nut adapter is adjacent to the proximal end of the first hollow end portion. The second end portion has an outer surface for engagement with a wheel spinner, wheel cap or other device desired to be secured to the wheel assembly. In a preferred embodiment, the outer surface of the second end portion of the nut adapter comprises a threaded outer surface for engagement with internal threads of a wheel spinner.

Other objects, advantages and novel features will become apparent from the following detailed description of the invention when considered in conjunction with the accompanying drawings.

BRIEF DESCRIPTION OF THE DRAWINGS

FIG. 5 is an exploded perspective view of the wheel spinner nut adapter of the present invention utilized with a wheel assembly and wheel spinner nut.

FIG. 6 is a side cross-sectional view, partially in perspective, of the present invention utilized with a wheel assembly and wheel spinner nut, all items shown connected.

FIG. 7 is another perspective view of the wheel spinner nut adapter of the present invention.

The same parts or elements throughout the drawings are designated by the same reference characters.

DETAILED DESCRIPTION OF THE PREFERRED EMBODIMENTS

Figures 1, 2:
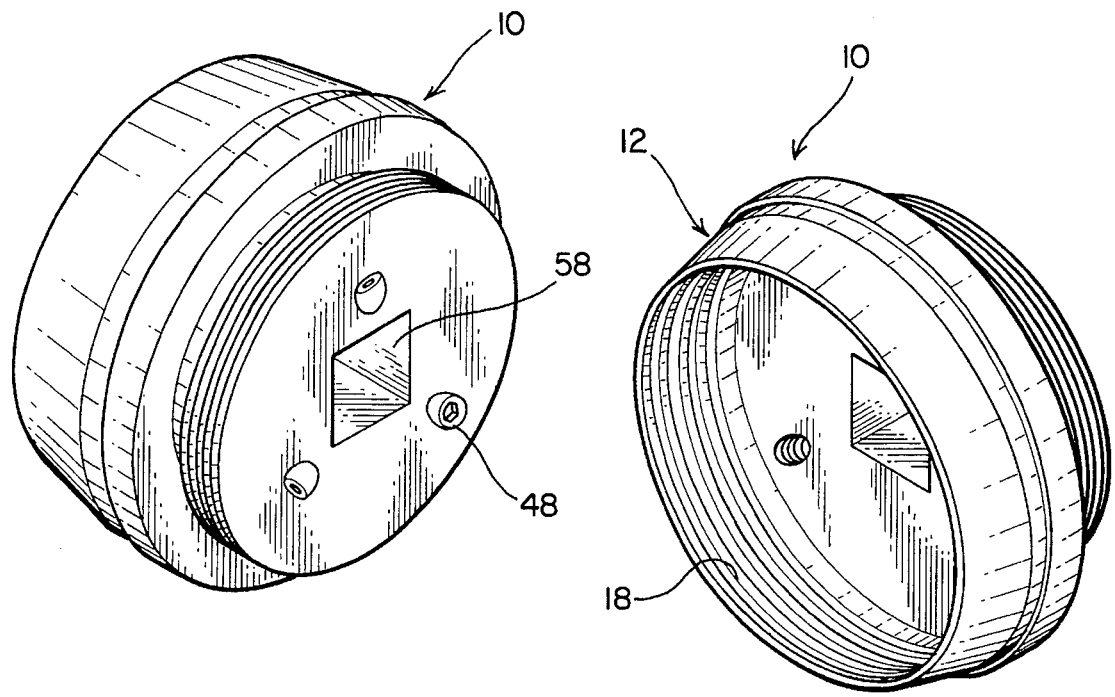
FIG. 1 is a front, right side perspective view of the wheel spinner nut adapter of the present invention.
FIG. 2 is a rear, left side perspective view thereof.
Figures 3, 4:
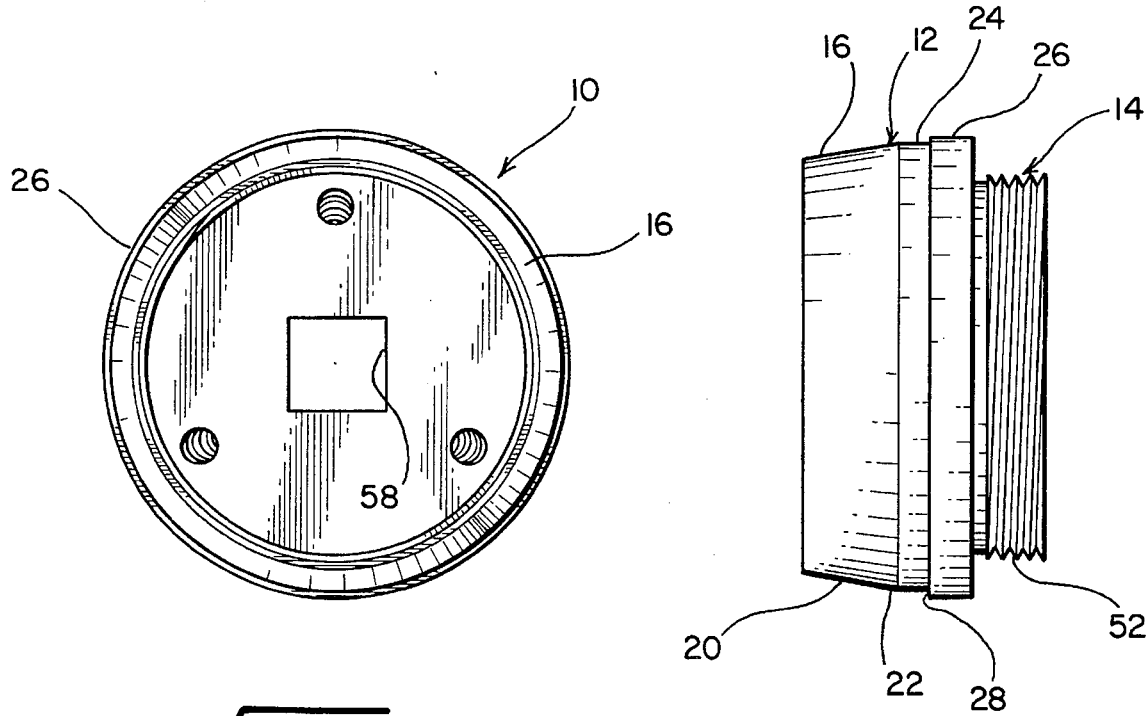
FIG. 3 is a rear plan view thereof.
FIG. 4 is a left side elevation view thereof.

Referring now to the drawings and the characters of reference marked thereon FIGS. 1–4 and 7 illustrate a preferred embodiment of the present invention, designated generally as 10.

The nut adapter 10 includes a first hollow end portion, designated generally as 12 and a second end portion, designated generally as 14. The first hollow end portion 12 includes a substantially smooth outer surface 16, tapered on a section thereof and with a circular cross section. First hollow end portion 12 includes a threaded inner surface 18 having a circular cross section and substantially constant diameter. A distal end 20 of the outer surface 16 is tapered and has a relatively small diameter. A proximal end 22 of the outer surface 16 has a relatively large diameter. The second end portion 14 is adjacent to the proximal end 22 of the first hollow end portion 12. An untapered section of the outer surface 16 includes a first subsection 24 and a second subsection 26, each with a substantially constant diameter, meeting at a step 28.

Referring now to FIG. 5, it can be seen how the nut adapter 10 of the present invention may be used. The first end 30 of a hub adapter 32 is attached to the studs 34 of a brake drum 36 of an axle assembly 38. The wheel 40 is slid over the second threaded end 42 of the hub adapter 32. Teeth (not shown) on the hub of the wheel 40 engage corresponding teeth 46 on the exterior surface of the hub adapter 32, thus preventing relative rotation therebetween.

Normally, a user is restricted to the particular wheel manufacturer's wheel spinners. However, with the nut adapter 10 of the present invention, the user simply screws the nut adapter 10 on the end 42 of the hub adapter 32. Threaded inner surface 18 engages the external threads 42 on the second end of the hub adapter 32. As the nut adapter 10 is screwed into position, the tapered outer surface 16 abuts and is secured against the wheel hub 47 of the wheel assembly 40.

A plurality of spaced set screws 48 engage the end of the hub adapter 32 to assure a tight fastening of the nut adapter 10 to the wheel hub 47. An axially extending square shaped opening 58 may be used for engagement with an impact gun for efficient tightening. Finally, a wheel spinner 50 of the desired type may be screwed onto the threaded outer surface 52 of the second end portion 14o Threaded outer surface 52 generally has a circular cross section and substantially constant diameter along its length.

The threaded inner surface has a diameter preferably approximately 3 ¼ inches. Second end portion 14 has an outside diameter of preferably approximately 3 inches. Surface 26 has a diameter of preferably approximately 3 5/8 inches.

Obviously, many modifications and variations of the present invention are possible in light of the above teachings. For example, although the nut adapter 10 has been described with respect to its use with wheel spinners with threads, it is understood that this adapter may be used with spinners without threads, hex shaped nuts, wheel caps and other wheel accessories that require such adaptation. It is, therefore, to be understood that within the scope of the appended claims, the invention may be practiced otherwise than as specifically described.

What is claimed and desired to be secured by Letters Patent of the United States is:

1. A wheel spinner nut adapter for a wheel assembly, said wheel assembly being of the type that utilizes a hub adapter, said hub adapter being of the type which has a first end for engaging a wheel and a wheel axle assembly, and a second end with external threads which are conventionally used for engagement with internal threads of a wheel spinner, said wheel spinner nut adapter, comprising:

a) a first hollow end portion including,
      a substantially smooth outer surface being tapered on at least a section thereof, said outer surface having a circular cross-section and,
      a threaded inner surface having a circular cross-section and substantially constant diameter, said threaded inner surface being for engagement with external threads on a second end of a hub adapter,
      a distal end of said outer surface having a relatively small diameter and a proximal end of said outer surface having a relatively large diameter so that said outer surface abuts and may be secured against a wheel hub of a wheel assembly when tightened relative to said hub adapter; and b) a second end portion adjacent to said proximal end of said first hollow end portion, said second end portion having an outer circular surface for engagement with a wheel spinner, wheel cap or other device desired to be secured to the wheel assembly, said second end portion having an axially outer circular surface further including a plurality of spaced openings having axes extending at angles to the axis or the wheel to accommodate a plurality of set screws engageable with said hub adapter to assure a tight fastening of said nut adapter to said wheel hub.

2. The wheel spinner nut adapter of claim 1, wherein said outer surface of said second end portion comprises a threaded outer surface for engagement with internal threads of a wheel spinner.

3. The wheel spinner nut adapter of claim 1, wherein said outer surface of said second end portion is threaded with a circular cross section and substantially constant diameter along its length.

4. The wheel spinner nut adapter of claim 1, wherein said second end portion includes an axially extending square shaped opening to provide engagement with an impact gun for more efficient tightening.

5. The wheel spinner nut adapter of claim 1, wherein said first hollow end portion includes an untapered section at said proximal end.

6. The wheel spinner nut adapter of claim 1, wherein said untapered section includes a step forming two subsections, each with a substantially constant diameter.

* * * * *